(12) United States Patent
Delaney et al.

(10) Patent No.: US 7,616,643 B2
(45) Date of Patent: Nov. 10, 2009

(54) TECHNIQUES FOR INTEGRATED ROUTING OF CALL CIRCUIT SIGNALING AND THE INTERNET PROTOCOL

(75) Inventors: Robert Delaney, Raleigh, NC (US); Wayne Taylor, Durham, NC (US); Jonathan Felten, Morrisville, NC (US); Christopher C. O'Rourke, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 371 days.

(21) Appl. No.: 11/407,660

(22) Filed: Apr. 19, 2006

(65) Prior Publication Data
US 2007/0248103 A1    Oct. 25, 2007

(51) Int. Cl.
*H04L 12/28* (2006.01)
(52) U.S. Cl. .................. 370/395.5; 370/396; 370/395.1; 370/395.52
(58) Field of Classification Search ................. 713/150; 709/203; 370/395, 241, 352
See application file for complete search history.

(56) References Cited

U.S. PATENT DOCUMENTS

| | | | |
|---|---|---|---|
| 6,324,183 B1 | 11/2001 | Miller et al. | |
| 6,683,881 B1 | 1/2004 | Mijares et al. | |
| 2004/0243670 A1* | 12/2004 | Grimminger et al. | ......... 709/203 |
| 2004/0264671 A1* | 12/2004 | Lamberton et al. | ..... 379/221.03 |
| 2005/0195745 A1* | 9/2005 | Scott et al. | ................... 370/241 |
| 2006/0153202 A1* | 7/2006 | Dantu et al. | ........... 370/395.52 |
| 2008/0002669 A1* | 1/2008 | O'Brien et al. | ............. 370/352 |

OTHER PUBLICATIONS

U.S. Appl. No. 10/757,807, filed Jul. 14, 2005, Schantz.

* cited by examiner

*Primary Examiner*—Simon Sing
*Assistant Examiner*—Simon King
(74) *Attorney, Agent, or Firm*—Patent Capital Group

(57) ABSTRACT

Techniques for processing an IP packet at a router that supports SS7 signaling include receiving IP routing data that associates a network link and a destination IP address for a node in a signaling network that includes a plurality of signaling nodes. When an ingress IP data packet is received, it is determined whether conditions are satisfied for locally processing an SS7 payload within the ingress IP data packet. If it is determined that conditions are satisfied for locally processing the SS7 payload, then the SS7 payload is processed locally, i.e., without sending the SS7 payload over a network link to a different node in the signaling network. If it is determined that conditions are not satisfied for locally processing the SS7 payload, then the ingress IP data packet is routed normally. These techniques allow reduced numbers of expensive STP devices and expanded routing options in a signaling network.

27 Claims, 7 Drawing Sheets

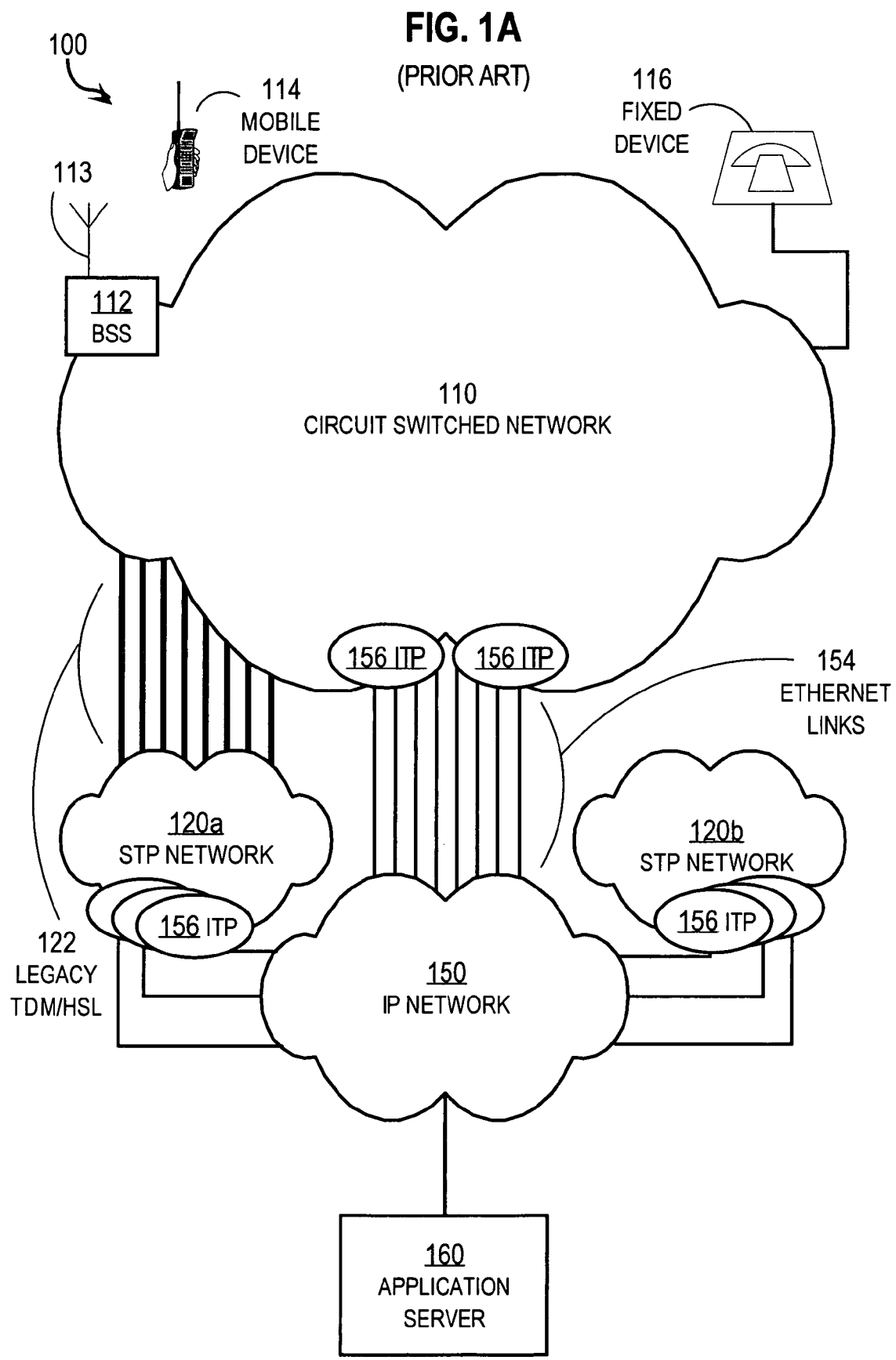

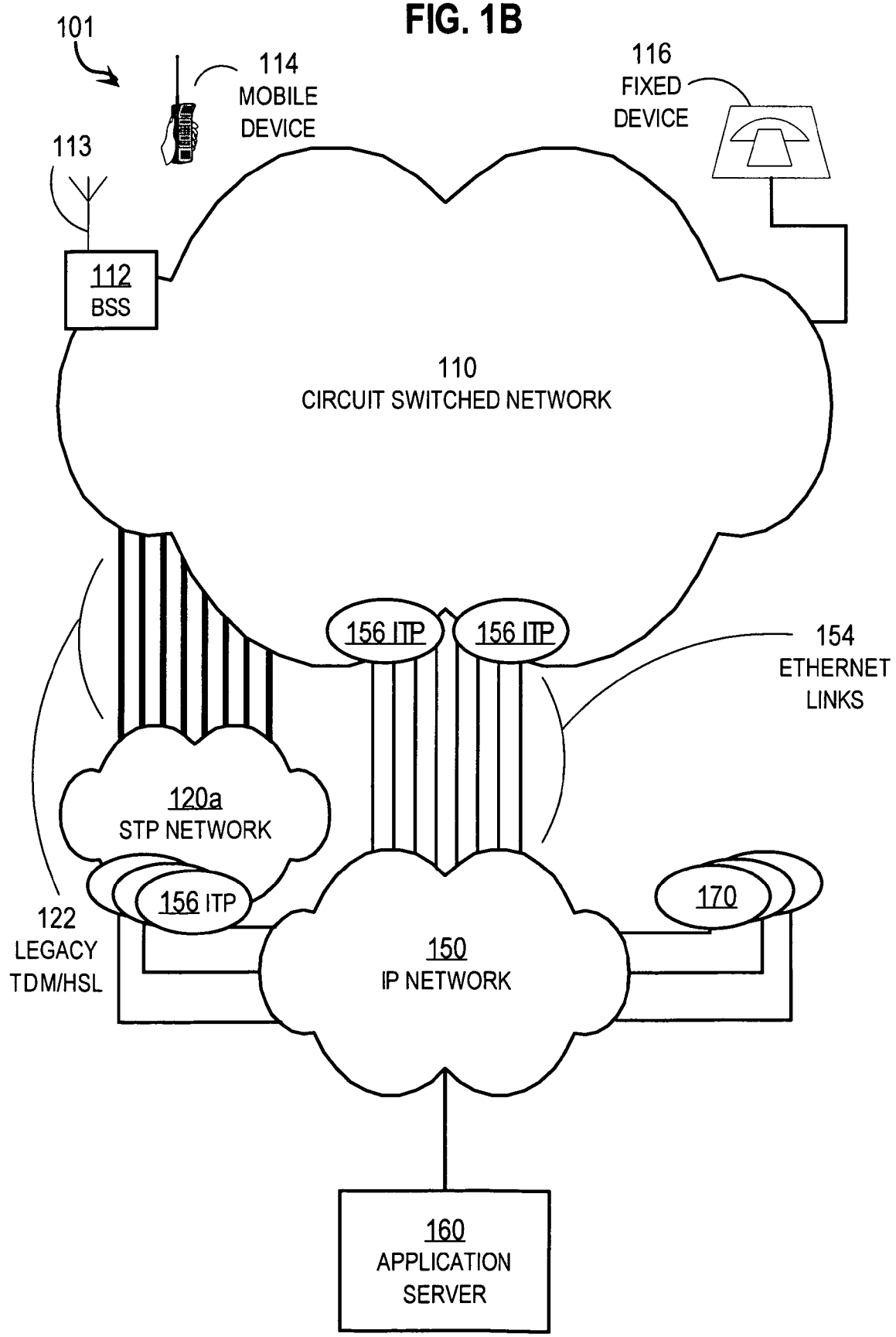

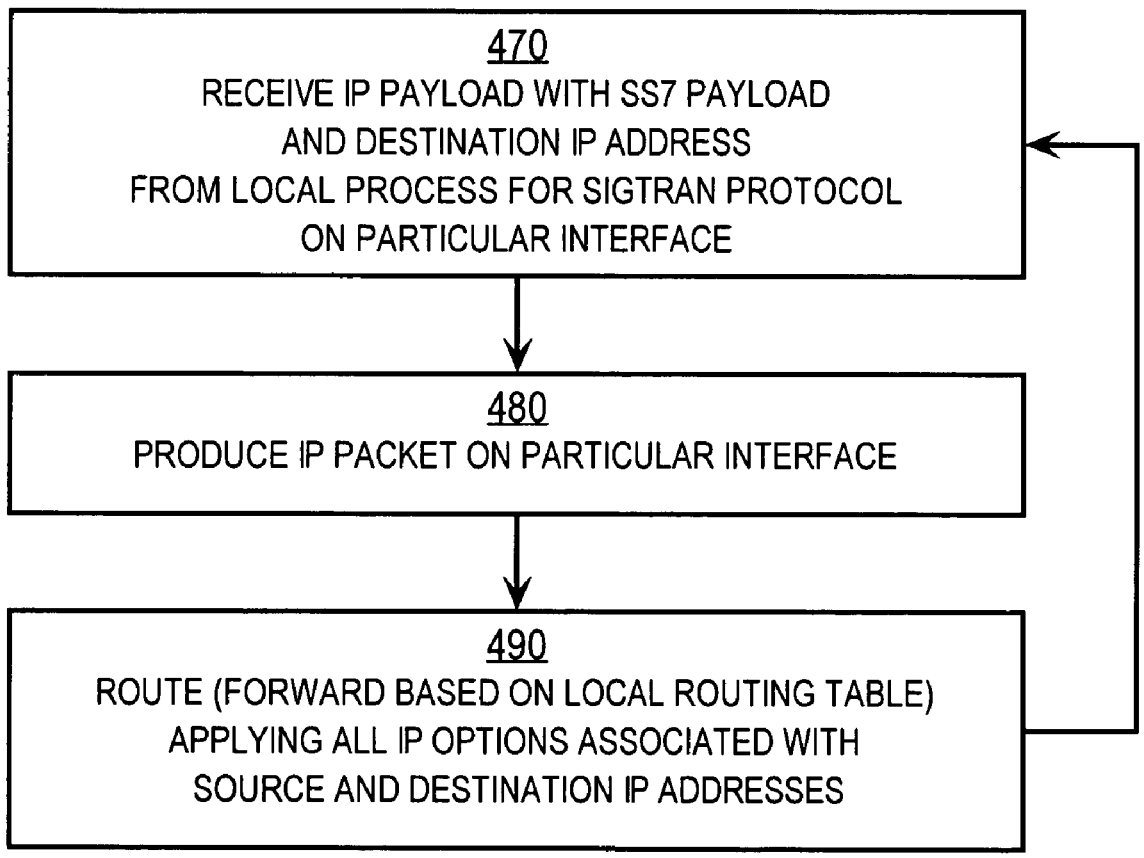

TECHNIQUES FOR INTEGRATED ROUTING OF CALL CIRCUIT SIGNALING AND THE INTERNET PROTOCOL

BACKGROUND OF THE INVENTION

1. Field of the Invention

The present invention relates to signaling to set up, maintain and tear down circuits in circuit switched networks, such as the public telephone system, and virtual circuits in packet switched networks, such as for voice over the Internet Protocol (VoIP); and, in particular, to using Internet Protocol (IP) routers to replace signal transfer point (STP) routers used in legacy telephone systems or SIP based transfer functions within Call State Control functions (CSCF) in VoIP.

2. Description of the Related Art

Networks of communications devices and general-purpose computer systems connected by external communication links are well known and widely used in commerce. The networks often include one or more network devices that facilitate the passage of information between end stations, such as telephones and general purpose computing devices, that originate or receive the information. A network node is a network device or end station connected by the communication links. Information is exchanged between network nodes according to one or more of many well known, new or still developing protocols. In this context, a protocol consists of a set of rules defining how the nodes interact with each other based on information sent over the communication links.

Legacy telephone systems utilize a network of switches connected by communication links including twisted pair copper wire and large capacity trunk lines. Various telephone devices are connected directly or indirectly to these switches. When a call is made, multiple switches in the network are configured to provide a complete circuit between two or more calling and called parties. Such a network is called a circuit-switched network. Signaling information, as used herein, is data that indicates to each switch what connections to make internally to establish, maintain or tear down a circuit between calling and called parties. In some systems using in-band signaling, the communication links used to connect called and calling parties are also used to communicate signaling information. As networks increased in size and a menu of telephone system functions increased (e.g., call forwarding, voice mail, toll free long distance, etc.), a separate network of signaling devices becomes effective. Thus in larger and more modem legacy telephone systems, out-of-band signaling is used, in which separate signaling devices communicate with each other over different communication links devoted to signaling. The out-of-band signaling uses one signaling device to control multiple switches, and not only diverts traffic from the main communication lines, but also sets up a typical circuit by sending less signaling information between signaling devices than would have been sent among the switches themselves.

Common Channel Signaling System 7 (SS7) is a set of standards that define the protocols and procedures for exchanging information between signaling devices in a signaling network. In effect, the SS7 network of signaling devices functions as a control center that governs all signaling network services and functions. Those functions have expanded over the years to include subscriber authentication, telephone number portability, mobile phone location, short message service (SMS), and other data services.

The signaling devices using SS7 are called herein, SS7 nodes. A current widely deployed commercial SS7 node is called a signal transfer point (STP). The STP is connected to multiple switches in the circuit-switched network. A signaling control point (SCP) is a node in the circuit-switched network that contains a service database and application software to provide one of the expanded services. An SCP is also connected to an STP. An STP receives a request from a switch for a connection and notifies the next switch in the circuit to be established for the call how to make its connections. The STP inserts any logic and checks any SCP and other system databases needed to determine or inform the next switch how to make the connections in consonance with the services offered by the call provider. The STPs communicate with switches, each other and with SCPs using signaling links that are set by the SS7 standard at 56 kilobits per second (Kb/s, where 1 Kb is on the order of $10^3$ bits, actually 1024 bits, and a bit is a binary digit). This limit is easily exceeded in modem networks, so the standard was extended to include high speed links (HSL) that allow about fourteen (14) times this speed, and time division multiplexing (TDM) that allows signals to alternately use the same communication links.

A packet switched network (PSN) uses multi-purpose physical connections between adjacent nodes in a network to send limited-sized packets of data among connected nodes. At each intermediate node a decision is reached about which communication link to forward the packet received, if any. A long message comprises a series of packets that may be routed differently among nodes based on the available and less congested connections. A particular physical connection is used by packets from many different messages and is not reserved for a particular combination of communicating parties. The flexibility and robustness of PSNs has led to their wide adoption. In particular, the Internet Protocol (IP) has gained wide acceptance for communicating data, including voice and video data, between far flung end nodes on a PSN. PSN routers and switches are widely used in public and private networks, and can often be obtained and operated more cheaply than STP devices. IP communicates over Ethernet links that are capable of data rates from Megabits per second (Mb/s, 1 Mb is on the order of $10^6$ bits) to ten Gigabit per second (Gb/s, 1 Gb is on the order of $10^9$ bits).

A recent approach is to use lower cost, higher speed and more widely available IP devices, rather than STP devices, to handle some signaling traffic. Special protocols for sending signaling data packets over IP have been developed, including SCTP, and also including M2PA, M3UA and SUA for carrying various layers of the original SS7 protocol stack, MTP3, SCCP, and TCAP, respectively, inside SCTP payloads. These acronyms are defined in a later section, with reference to FIG. 2. With the shift in the industry direction away from TDM based signaling towards IP based signaling, some signaling routers such as upgraded STPs provide not only traditional MTP/SCCP layer routing but also routing at the IP layer (e.g. BGP, OSPF).

A relatively low cost IP gateway device translates between STP signals and IP data packets. For example, IP Transfer Point (ITP) switches, available from Cisco Systems of San Jose, Calif. serve as gateway routers between STP nodes and PSN nodes. More and more SCPs and switches are being deployed with IP compatible signaling links (e.g., Ethernet) to take advantage of an IP network between the switch, the SCP and the STP.

While suitable for many purposes and commercially deployed in many networks, there is a disadvantage in the approach of using an STP device with gateway devices to translate STP signals to IP data packets. The STP devices are expensive to maintain and upgrade. Much of the expense lies in the processing of the special purpose legacy network protocols that are redundant in function with the more widely used and lower cost to implement IP protocol. Furthermore, the STP routing protocol MTP3 has a limited set of options compared to IP routing. Legacy STP devices typically cannot route at the IP layer themselves.

IP routing technologies include many existing, and developing processes, including, among others, different routing protocols, including static routing, Border Gateway Protocol (BGP), Enhanced Interior Gateway Routing Protocol (EIGRP), Open Shortest Path First (OSPF), and Multiple Protocol Label Switching (MPLS). IP technologies also include different treatment of packets to be routed, including quality of service, tunneling using MPLS or a layer 2 protocol, virtual private networks, network address translation (NAT), packet encryption in IPsec, IP version 6 addresses, traffic filtering, access control lists, policy based routing, Hot Standby Routing Protocol (HSRP), Next Hop Resolution Protocol (NHRP), and any transport over MPLS (AToM). IP technologies continue to grow with time. Most of these options are not available in MTP of the original SS7 standard.

Upgrades for expanded services at the STPs are expensive because their costs are leveraged over a relatively small specialized community of STP users. As networks expand, ever more STPs are procured, and each purchase is typically matched with an IP gateway device. Yet the combination fails to use the full spectrum of IP routing options.

Based on the foregoing, there is a clear need for techniques that provide SS7 signaling for circuit switched networks that do not suffer one or more of the disadvantages of current systems using an STP paired with an IP gateway device.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a bock diagram that illustrates a system for using an IP network for some of the signaling for a circuit-switched network;

FIG. 1B is a bock diagram that illustrates a system for using an IP network for some of the signaling for a circuit-switched network, according to an embodiment;

FIG. 4B is a flow chart that illustrates a method for processing an egress IP packet at a SS7 capable router, according to an embodiment.

DETAILED DESCRIPTION

Figure 2:
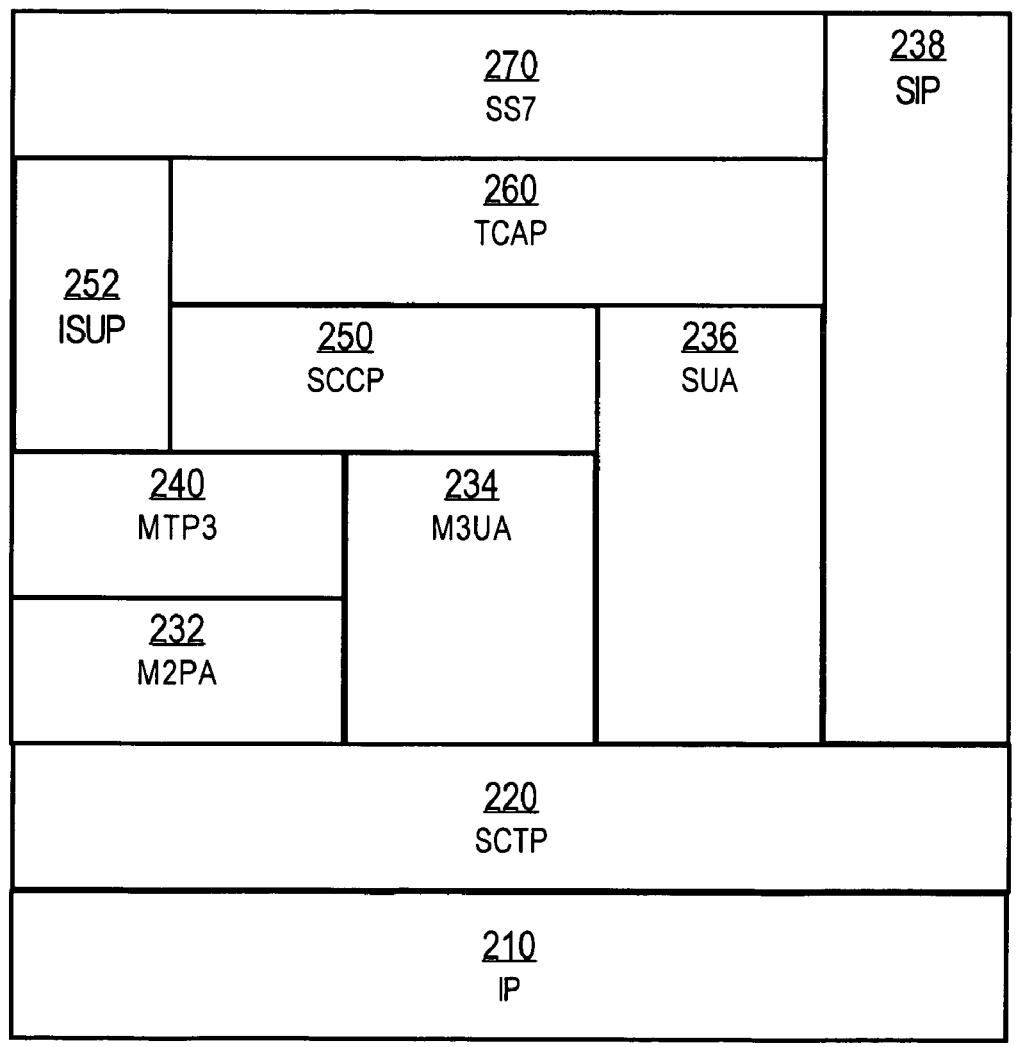
FIG. 2 is a block diagram that illustrates protocol stacks for sending SS7 signaling data over IP.

Techniques are described for processing an Internet Protocol (IP) packet at a router that supports signaling between switches of a circuit switched network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described in the following in the context of SS7 signaling over IP in a packet-switched network. However, the invention is not limited to these embodiments. In other embodiments, signaling for virtual circuits for calling over packet-switched networks are also routed using IP technologies.

1.0 NETWORK OVERVIEW

FIG. 1A is a bock diagram that illustrates a system 100 for using an IP network 150 for some of the signaling for a circuit-switched network (CSN) 110. In the illustrated example, the CSN 110 is used to set up circuits between a calling and called party for an arbitrarily long duration controlled by the two parties. In this example, the calling party uses a fixed telephone device 116 connected to a switch (not shown) in the CSN 110. The called party uses a mobile device 114 that communicates with an antenna 113 connected to a base station system (BSS) 112. The switches in CSN 110 must be set so that a circuit is established between devices 116 and 112.

The system 100 includes STP networks 120*a*, 120*b*, IP network 150, and Internet Transfer Points (ITPs) 156 that serve as IP gateway devices. The system 100 also includes application server 160. Although two STP networks 120*a*, 120*b*, one IP network 150 and one application server 160 are shown for purposes of illustration, other systems used more STP networks or more IP networks or more or fewer application server.

Each STP network 120*a*, 120*b* (collectively referenced hereinafter as STP network 120) includes one or more STP devices. In a typical STP network, STP devices are deployed in redundant pairs for reliability; and several networked STP pairs control switches for a contiguous portion of CSN 110, which is often also geographically contiguous. Each STP network 120 typically includes one or more SCPs (not shown). The STP network 120*a* represents STP networks that maintain legacy connections with switches in CSN 110. For example STP network 120*a* maintains legacy TDM/HSL 122 with switches in CSN 110. The STP network 120*b* represents STP networks that use IP connections with switches in CSN 110 and one or more SCPs in STP network 120*a*. IP gateway devices are deployed at the edge of the IP network used by these STPs and switches. Thus the STPS in STP network 120*b* are connected through ITP devices 156 to IP network 150. Similarly, the switches in CSN 110 are connected through ITP devices 156 to IP network 150. The links between the ITP devices 146 and the IP network 150 are Ethernet links 154.

Many of the functions provided by the system 100 depend on software applications and data bases available to the STPs in SCPs. These applications and databases include, for example, subscriber information, associations between toll free numbers (which are virtual phone numbers) and actual phone number, home data centers for mobile phone users, instant message processing, voice mail etc. Some of these applications and databases (not shown) are SCPs connected over STP links directly in an STP network 120. However, more of such applications and databases are migrating to computers called servers connected to the IP network. The application server 160 represents a server that provides some SCP function for the services offered to subscribers to the CSN 110.

When the caller at fixed device 116 attempts to contact the user of mobile device 114, this information, in the form of the caller's phone number and the called party's phone number, is passed to the local switch to which device 116 is connected. That switch passes the information to an STP to determine how to configure the local switch to complete the call. The local switch doesn't know because it depends on where the mobile device 114 is. A request is made to an application to resolve the current location of mobile device 114. Meanwhile, when the mobile device 114 comes in range of antenna 113, the device 114 sends a location update or registration identifier. This identifier is sent to an application containing the subscriber's information to update the subscriber's location and authenticate the subscriber. The information that the mobile device is being served by base station 112 is then retained by the home base of the mobile device. All this is signaling information.

It is assumed for purposes of illustration that switches near fixed device 116 communicate through IP network 150 to an STP in STP network 120b. Similarly, it is assumed for purposes of illustration that switches near base station 112 communicate directly to an STP in STP network 120a. It is further assumed that the database for the home base of mobile device 114 is maintained at application server 160. The signaling information for the request from fixed device 116 passes through IP network 150 to an STP in STP network 120b, which resolves the request with a message through IP network 150 to applications server 160 and the response through IP network 150. The next switch to configure is determined and signaling data is sent to that switch also through IP network 150. Each switch in turn is configured going through IP network 150, until switches controlled by STPs in STP network 120a are involved. In some cases, an STP in STP network 120b, determines the next switch to be configured belongs to an STP in STP network 120a. A signaling message is sent from STP network 120b to STP network 120 across IP network 150. Thereafter, STPs in STP network 120a communicate with switches to be configured directly, without going through IP network 150. However, any use of the information in applications server 160 requires signals be translated through an ITP 156.

FIG. 2 is a bock diagram that illustrates protocol stacks 200 for sending SS7 signaling data over IP. The protocols are effective at different layers of operation within each network node, from selecting a link for transferring signaling packets, to the format of information indicated by those packets, to identifying which software application executing on a computer system sends or receives the information. Signaling between nodes over IP is effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, usually higher layer protocol. The payload protocol is said to be encapsulated in the header protocol. The headers included in a packet traversing multiple heterogeneous networks, such as the Internet, typically include a physical header, a data-link header, an internetwork header, a transport header, and an application layer protocol. FIG. 2 illustrates protocols encapsulated in an Internet payload.

In an SS7 signaling packet over IP, headers are found for several protocols, with SS7 application data 270 found in the payload of the top protocol. The SS7 application data 270 may itself include an application layer header and an application layer payload.

In a first conventional approach, there are six protocol headers from IP 210 to SS7 270. These are the Stream Control Transfer Protocol (SCTP) header 220, the Message Transfer Part 2, Peer-to-Peer Adaptation (M2PA) header 232, and the Message Transfer Part 3 (MTP3) header 240. Those headers are followed by the Signaling Connection Control Part (SCCP) header 250 and the Transaction Capabilities Application Part (TCAP) header 260. The SS7 application data 270 follows the TCAP header 260 in the SS7 over IP data packet. The MTP3, SCCP and TCAP protocols are also used in the legacy SS7 signaling systems that do not use IP. The legacy SS7 protocol stack includes two other parts of the Message Transfer Part (MTP) protocol, the MTP1 and MTP2 protocols instead of IP and its layer 1 and layer 2 protocols.

The SCTP header 220 provides transport layer functions for IP packets, such as detecting missing data packets and providing sequencing information. SCTP is described in more detail in Request For Comments (RFC) document 2960 of the Internet Engineering Task Force (IETF). RFC documents can be found by number at the IETF web site at domain ietf.org. The entire contents of RFC 2960 are hereby incorporated by reference as if fully set forth herein.

The MTP3 header 240 provides information for network layer functions. Message Transfer Part level 3 (MTP3) is the network layer in the SS7 protocol stack. It routes SS7 signaling messages to public network nodes by means of Destination Point Codes, and to the appropriate signaling entity within a node by means of a Service Info Octet. MTP3 is specified as part of the SS7 protocol. MTP3 is fully defined in an American National Standards Institute (ANSI) of Washington, D.C. specification entitled "Telecommunications Signaling Systems No. 7 (SS7)-T1.111" and International Telecommunication Union (ITU) of Geneva, Switzerland, publication Q.704, the entire contents of each of which are hereby incorporated by reference as if fully set forth herein. SS7 is fully defined in ANSI T.110 through T1.116 and ITU Q.703 through Q.704, Q.711 through Q.716, and Q.771 through Q.775, the entire contents of each of which are hereby incorporated by reference as if fully set forth herein.

The M2PA header 232 supports the transport of SS7 MTP3 signaling messages over IP, using the services of the SCTP. M2PA allows for full MTP3 message-handling and network-management capabilities between any two SS7 nodes communicating over an IP network. The MTP specification requires that each node with an MTP3 layer will be represented by an SS7 point code. Thus, each IP signaling point must have its own SS7 point code. M2PA is described in more detail in RFC 4165, the entire contents of which are hereby incorporated by reference as if fully set forth herein.

The SCCP header 250 contains information for resolving addresses, such as a global title, and for locating devices in the network. A global title is an address that is used on the mobile telephone networks to communicate among different mobile telephone service providers. SCCP also allows different applications within a signaling point to be addressed separately. The MTP can only receive and deliver messages from a node as a whole; it does not deal with software applications within a node. SCCP is described in more detail in ANSI T1.112 and ITU Q.711-716 cited above.

The TCAP header 260 contains information for supporting non-circuit related information exchange between signaling points, such as forming a session of multiple messages between the same two signaling devices on the network. TCAP provides a structured method to request processing of an operation at a remote node, defining the information flow to control the operation and the reporting of its result. Operations and their results are carried out within a session known as a dialogue (at the 'top' of TCAP) or a transaction (at the 'bottom' of TCAP). Within a dialogue, many operations may be active, and at different stages of processing. The operations and their results are conveyed in information elements known as components. The operation of TCAP is to store components for transmission received form the higher layers until a dialogue handling information element is received, at which time all stored components are formatted into a single TCAP message and sent through SCCP to the peer TCAP. TCAP is defined in T1.114 and Q.771 through Q.775, cited above.

A Signaling Transport (SIGTRAN) working group has been established to support the processing of packets that carry signaling information, including SS7, over IP. A SIGTRAN software suite is being or has been developed for STPs to process any of the protocol stacks shown in FIG. 2, for receiving signaling data, processing it, and sending out signaling data to another node in the signaling network over an IP network. SIGTRAN is defined in a series of IETF RFCs and draft documents available at the iet.org web site.

In a second approach, SCCP and TCAP are replaced by Integrated Services Digital Network (ISDN) User Part (ISUP). ISUP signaling messages are used to setup, manage and release trunk circuits that carry voice calls between central office switches. ISUP messages also carry caller ID information, such as the calling party's telephone number and name. ISUP is used for both ISDN and non-ISDN calls between central office switches. ISUP is defined within the SS7 standards, cited above.

In a third approach, M2PA header 232 ad MTP3 header 240 are replaced by MTP-3-User Adaptation Layer (M3UA) header 234. M3UA is defined in IETF RFC 3332, the entire contents of which are hereby incorporated by reference as if fully set forth herein.

In a fourth approach, M2PA header 232 and MTP3 header 240 and SCCP header 250 are replaced by a SCCP User Adaptation Layer (SUA) header 236. SUA is a client/server protocol that provides a gateway to the legacy SS7 network for IP-based applications that interface at the SCCP layer. SUA allows IP-enabled end nodes and applications access to the legacy SS7 network. SUA is described in more detail in RFC 3868, the entire contents of which are hereby incorporated by reference as if fully set forth herein.

In a fifth approach, M2PA header 232 and MTP3 header 240, SCCP header 250, TCAP header 260 and SS7 data 270 itself are replaced by a native IP signaling protocol, the Session Initiation Protocol (SIP). SIP is designed to establish sessions between any network nodes for any media, including, voice, such as VoIP, video, and teleconferencing. It can be used to support or replace SS7 signaling for circuit-switched networks as well as virtual circuits over packet switched networks. SIP is described in more detail in RFC 3261, the entire contents of which are hereby incorporated by reference as if fully set forth herein. SIP can be transported not only by SCTP, but also by native IP transport protocols Transmission Control Protocol (TCP) and user Datagram protocol (UDP).

Any of these five approaches are indicated by a port number in the SCTP header 220.

2.0 SS7 CAPABLE ROUTER STRUCTURES

According to the illustrated embodiments of the invention, a router is upgraded to perform SIGTRAN processing of IP payloads that contain SS7 signaling data. Such a router, called herein a SS7 capable router, in various embodiments, allows a reduction in the number of STP devices used by a system, a reduction in the cost of procuring and maintaining STP devices, a reduction in the complexity at facilities established to provide SS7 signaling by using a single device instead of a STP-IP gateway pair of devices, and invocation of the more expansive routing technologies and higher data rates available for IP routing.

FIG. 1B is a bock diagram that illustrates a system 101 for using an IP network for some of the signaling for a circuit-switched network, according to an embodiment. In FIG. 1B, some ITP devices 156 are upgraded to SS7 capable ITP routers 170 and STP network 120b is eliminated. All other items in FIG. 1B are as described in FIG. 1A. The elimination of STP network 120b provides the cost and complexity decreases mentioned above. In addition, because the same device, SS7 capable ITP router 170, is both processing the routing of the SS7 signaling and performing native IP routing, the full array of IP routing technologies is available for the signaling data. Thus requests to application server 160 can be routed there using specific parameters in the SS7 message to shape and queue important signaling messages, can be transmitted over the best connections determined to be available based upon such items as availability and congestion, unwanted requests for connections can be blocked by an access control list, and virtual private networks can be used to avoid other users of IP network 150 from seeing the signaling messages.

Figure 3:
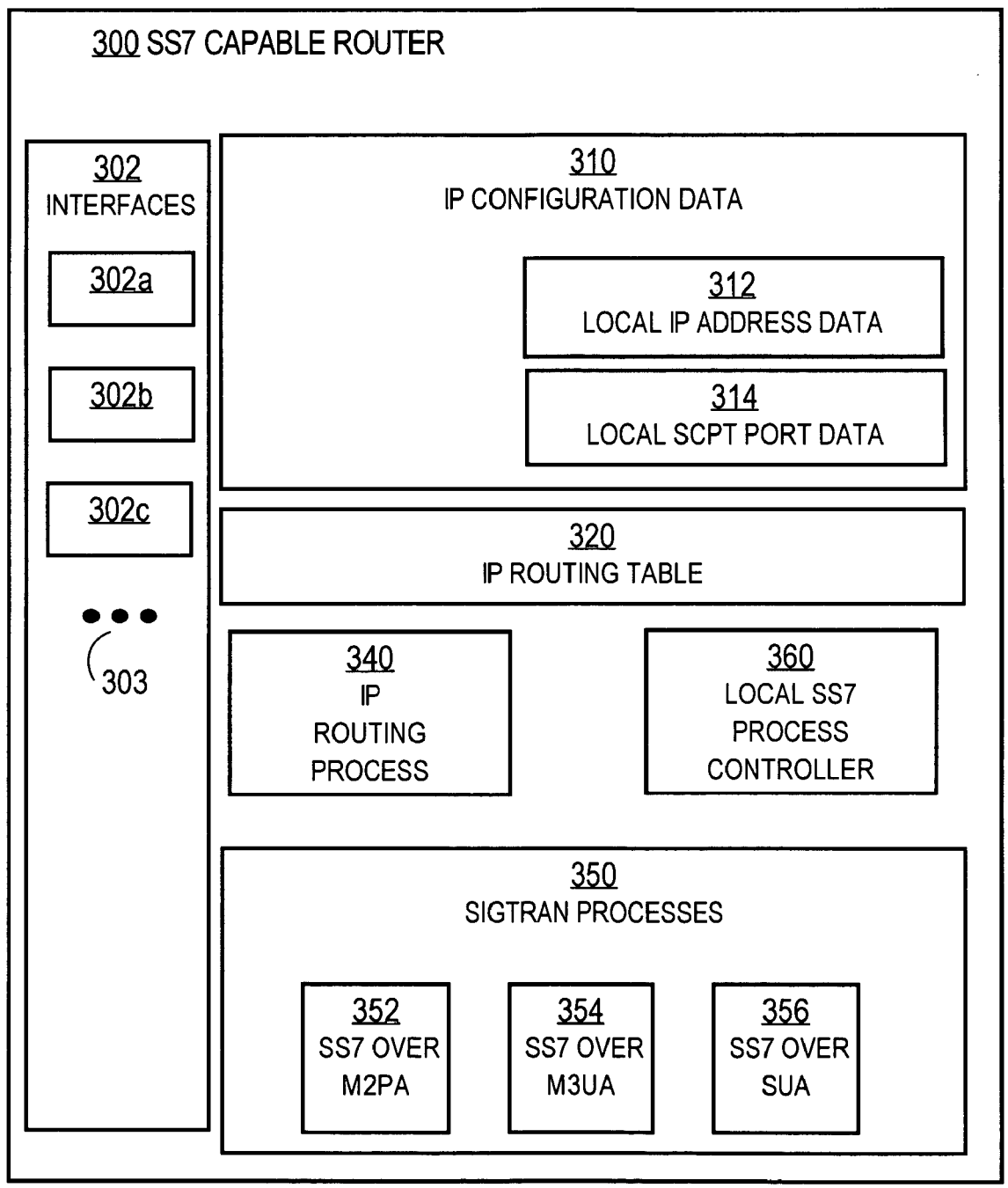
FIG. 3 is a block diagram that illustrates a SS7 capable router, according to an embodiment.

FIG. 3 is a block diagram that illustrates a SS7 capable router 300, according to an embodiment. A more complete description of a router is provided in a later section with reference to FIG. 5. In some embodiments, SS7 capable router 300 serves as one of the upgraded ITP routers 170 depicted in FIG. 1B.

Like any other IP router, the router 300 includes multiple network interfaces 302, including interface 302a, 302b, 302c and multiple other interfaces indicated by ellipsis 303. In various embodiments, each of the interfaces 302 includes memory and one or more processors. Each interface is identified locally on the router by a unique interface identifier (ID). Also, like more conventional routers, the SS7 capable router 300 includes, on computer-readable media in the router, such as memory on one or more processors, IP configuration data structure 310 and IP routing table data structure 320. Further, like conventional routers, the SS7 capable router 300 includes an IP routing process, either running on one or more processors or residing as instructions stored on a computer-readable medium.

The IP configuration data in data structure 310 includes data that indicates what IP routing technologies are operative for each IP address, such as quality of service (QoS) that limits maximum bandwidth, latency and jitter allowed for an IP address, Multiple Protocol Label Switching (MPLS) to create tunnels between various end points, virtual private networks to collect one or more tunnels for one entity, rate limiting, policy limiting, access control lists (ACL), traffic filtering, and interface conversion for underlying media, e.g., for changing underlying media among Ethernet, optical, token ring, asynchronous transfer mode (ATM), etc. Other technologies are also available, as is well known in the art, and further IP technologies are anticipated in the future. The IP configuration data for more conventional routers includes local IP address data structure 312 that holds data that indicates which IP addresses are local, and what IP technologies apply to those local addresses. IPv4 addresses are four octets, often presented as four decimal numbers, each between 0 and 255, inclusive, separated by dots. An example of local IP address data for a router with two local IP addresses is given in Table 1. The data in Table 1 indicates that the router is an end node for two virtual local area networks (VLANs) each associated with a unique VLAN identifier used as a label in underlying Ethernet headers. One VLAN is active and sending data; and the other is not.

TABLE 1

Example local IP address data.

| Local Address | VLAN identifier | State |
| --- | --- | --- |
| a.b.c.d | 1020 | Up |
| w.x.y.z | 1025 | Down |

According to some embodiments of the invention, the router 300 includes SIGTRAN processes 350 and a local SS7 process controller 360, each one either running on one or more processors or residing as instructions stored on a computer-readable medium. In the illustrated embodiment, the SIGTRAN processes 350 are implemented as software instructions stored on computer-readable memory and executed on one or more general purpose processors in router 300. In some embodiments, one or more portions of the processes 350 and 360 are implemented in hardware. In the illustrated embodiment, the IP configuration data 310 includes not only local IP address data 312, as in conventional routers, but also local SCTP port data 314, typically not found in conventional routers, as described in more detail below.

The SIGTRAN processes 350 include a first SS7 over M2PA process 352 for processing SS7 data in an M2PA payload, a second SS7 over M3UA process 354 for processing SS7 data in a M3UA payload, and a third SS7 over SUA process 356 for processing SS7 data in a SUA payload. In other embodiments other processes are included, such as SS7 over ISUP, and SIP (alone or in combination with SS7). The local SS7 process controller 360 determines whether to process an IP packet for its SS7 content or not; (primarily to determine which SCP, server or switch to forward the SS7 payload) and if so which of the SIGTRAN processes 350 to use. This determination is made based in part on the information about local SCTP ports kept in the local SCTP port data 314 in IP configuration data 310.

Besides being configured for IP processing, the router 300 is also configured for SS7 processing. In the illustrated embodiment, that configuration is provided in the form of a data structure 314 for storing local SCTP port data. Each of the SIGTRAN processes 350 is associated with a different SCTP port. When an IP message arrives with a SCTP header, the SCTP header indicates a destination port. The port indicates the next protocol in the stack and therefore the appropriate processing to interpret the data in the SCTP payload. An example of contents in a local SCTP port data structure 314 for a router 300 is given in Table 2. The data in Table 2 indicates what SCTP port is associated with each SIGTRAN process. In the illustrated embodiment, a different SIGTRAN process is programmed into different processors on different interfaces 302. The interface ID of the interface that is programmed with the appropriate SIGTRAN process is also indicated in Table 2 for this embodiment.

TABLE 2

Example local SCTP port data.

| SCTP port | Interface ID | Protocol in SCTP payload |
| --- | --- | --- |
| 5000 | 1151 | M2PA |
| 3000 | 1279 | M3UA |
| 2000 | 1087 | SUA |

Although data structures and processes are shown as integral components in FIG. 3 for purposes of illustration, in other embodiments, these processes and data structures occur in more or fewer blocks of contiguous storage or processing time. For example, in some embodiments, local SS7 process controller 360 is a part of the IP routing process 340.

The SIGTRAN processes 350 are well known in the art, but are usually implemented on STPs. According to the illustrated embodiments, the SIGTRAN processes 350 are implemented on a router 300 with an IP routing table 320, IP configuration data structure 310, and IP routing process 340. In the illustrated example, SS7 over M2PA is implemented in a process on interface 302a with interface ID 1151; SS7 over M3UA is implemented in a process on interface 302b with interface ID 1279; and SS7 over SUA is implemented in a process on interface 302c with interface ID 1087. An advantage of implementing these SIGTRAN processes on different processors is that the processing of several SS7 messages can be performed simultaneously.

3.0 SS7 CAPABLE ROUTER METHOD

Figure 4A:
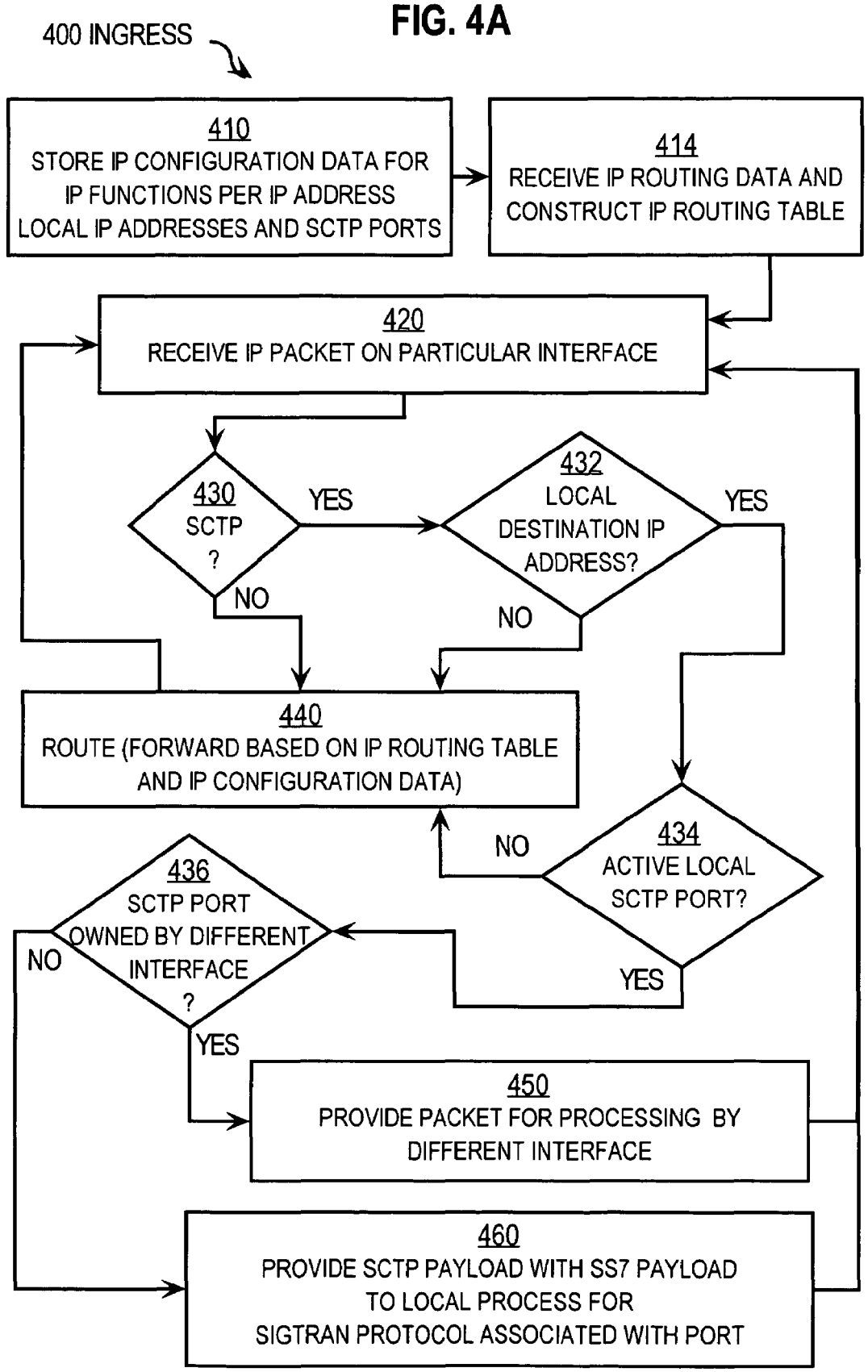
FIG. 4A is a flow chart that illustrates a method for processing an ingress IP packet at a SS7 capable router, according to an embodiment.

The local SS7 process controller 360 is not known in the art, and is described here, with reference to FIG. 4A and FIG. 4B. FIG. 4A is a flow chart that illustrates a method 400 for processing an ingress IP packet at a SS7 capable router, such as router 300, according to an embodiment. FIG. 4B is a flow chart that illustrates a method 401 in controller 360 for processing an egress IP packet at a SS7 capable router, according to an embodiment. Although steps are depicted in FIG. 4A and FIG. 4B in a particular order for purposes of illustration, in other embodiments one or more steps are performed in a different order or overlapping in time on one or more processors running in series or in parallel, or one or more steps are omitted, or the method is changed in some combination of ways. In various embodiments, the steps of FIG. 4A and FIG. 4B are performed by the local SS7 process controller 360, alone or in combination with IP routing process 340.

With reference to FIG. 4A, method 400 includes steps 410 and 414, which are similar to steps in conventional routers. In step 410, router 300 receives IP configuration data. For example, IP configuration data stored in an IP configuration data structure 310 is received, including the IP technologies associated with zero or more IP addresses, the local IP address data, such as shown in Table 1 are received and stored by IP routing process 340 in local IP address data structure 312; and the local SCPT port data shown in Table 2 is received and stored by local SS7 process controller 360 in local SCPT data structure 314.

In step 414, routing data is received and used to construct routing table data structure 320 in IP routing process 340. Any routing process known in the art may be used. In ITP routers the routing process uses any of the routing protocols supported by the Internet Operating System (IOS) of Cisco Systems, Inc. of San Jose, Calif., including open shortest path first (OSPF), Border Gateway Protocol (BGP), and Enhances Interior Gateway Protocol (EIGRP), all well known in the art.

In step 420, an IP packet is received on a particular interface of the router 300. Any IP technologies associated with the received IP packet in the IP configuration data are applied. Example IP technologies have already been mentioned. For purpose of illustration, it is assumed that an IP packet is received on interface 302b (with interface ID 1279). For purposes of illustration, it is further assumed that the IP header includes an IP address of a.b.c.d, and that the IP payload includes first an SCTP header with an SCTP destination port of 2000. It is also assumed that the packet is not blocked by an ACL or other IP filtering performed based on the IP technologies that apply to the source and destination addresses of the received IP packet.

In step 430, it is determined whether the next protocol field in the IP header indicates an SCTP header (thus signifying the first part of the IP payload is a SCTP header). If not, there will be no local SS7 processing because there is no SS7 data in this IP payload. Control passes to step 440.

In step 440, the IP packet is routed normally in the IP routing process 340, i.e., based on the IP routing table, the IP destination in the IP header and any IP technologies associated in the IP configuration data with the IP source or destination addresses in the IP header. For example, in some embodiments a particular QoS associated with the source IP address is applied to the routing decision. In some embodiments, an ACL causes the IP routing process to block forwarding of the IP packet. Control then passes back to step 420 to receive the next IP packet.

If it is determined in step 430 that the first header in the IP payload is an SCTP header, then control passes to step 432. In the example assumed, the first header in the IP payload is an SCTP header, and control does pass to step 432.

In step 432, it is determined whether the IP destination address indicates a local IP address. For example, the IP destination address in the IP packet is compared to the data in the local IP address data structure 312. If none listed match, control passes to step 440, to route the packet normally. The SS7 is not to be processed by the present router. If any do match, control passes to step 434.

With the assumed value of a.b.c.d for the IP destination address, and the assumed local IP address data structure contents listed in Table 1, which includes address a.b.c.d, it is determined that the destination IP address is a local IP address; and control passes to step 434. In some embodiments, during step 432, a virtual routing and forwarding (VRF) table associated with the ingress interface is also taken into consideration, because the IP address may belong to the local router in one VRF table and belong to a different router in another VRF table.

In step 434, it is determined whether the SCTP destination port is an active port on the local router, e.g, is listed in the local SCPT port data structure 314. If not, the SCTP message is not intended for the local processes, and control passes to step 440 to route the IP packet normally. If it is determined that the SCTP destination port is an active port on the local router, listed in the local SCPT port data structure 314, then the SS7 data in the SCTP payload is to be processed locally by the appropriate SIGTRAN process 350, and control passes to step 436.

With the assumed value of SCTP destination port of 2000, this value is found in the local SCPT port data structure as listed in Table 2. Therefore, the destination SCTP port is active on the local router and control passes to step 436. Note that SCTP port 2000 is associated in Table 2 with the SUA protocol and interface ID 1087 for interface 302c.

In step 436, it is determined whether the SCTP port is owned by the particular interface that received the IP packet or by a different interface. For example, the interface ID of the particular interface that received the IP packet is compared to the interface ID associated with the SCTP port in the local SCTP port data structure 314. If the SCTP port is owned by a different interface, e.g., if the interface ID of the particular interface that received the IP packet is different from the interface ID in the local SCTP port data structure, then control passes to step 450.

With the assumed values, the interface ID of the receiving interface 302b is 1279 and does not match the interface ID 1087 of the owning interface, which is interface 302c. Therefore control passes to step 450.

In step 450, the IP packet is provided for processing by the different interface. For example, the memory location of the IP packet in shared memory is passed to the process executing on the different owning interface so that the different owning interface processor processes the IP packet, with the SIGTRAN process associated with that interface.

With the assumed values, during step 450, the memory location of the IP packet received is passed to the SS7 over SUA process 356 executing on interface 302c.

In the illustrated embodiment, control then passes back to step 420 to receive the next IP packet. Processing of IP packets on egress is performed by a parallel process running on one or more processors on router 300. In some embodiments, before the next IP packet received is processed, the processor checks for an egress IP packet and performs the steps of method 401, if any egress IP packets are received from one of the SIGTRAN processes.

In some embodiments, the SIGTRAN processes 350 are not executed solely on one or a few interfaces, and any interface or a common central processor can execute any of the SIGTRAN processes. In such embodiments, steps 436 and step 450 are omitted, and control passes to step 460 instead of to step 436.

If it is determined, in step 436, that the SCTP port is not owned by a different interface, or if step 436 is omitted, then control passes to step 460. In step 460 the SCTP payload is processed with the local process for the SIGTRAN protocol associated with the SCTP destination port. For example, with the assumed values, the central processor or the processor on interface 302b invokes the SS7 over SUA process based on the SUA protocol associated with port 2000 in the local SCTP port data structure 314, as listed in Table 2. Similarly, an IP packet received on interface 302b with an SCTP destination port of 3000 (for M3UA) belongs to interface 302b, as indicated by the interface ID 1279 associated with port 3000. Thus, during step 436 it is determined that the receiving interface is also the process owning interface and control passes to step 460 During step 460, the processor on 302b processes the IP packet with the SS7 over M3UA process 354 executing on the local interface 302b. In the illustrated embodiment, control passes back to step 420 to receive the next IP packet. As described above, in some embodiments, control passes to method 401.

FIG. 4B illustrates method 401, and includes step 470, step 480 and step 490. It is assumed that steps 410 and 414 of method 400 have been executed before method 401, by at least one of IP routing process 340 and the local SS7 process controller 360.

In step 470, an SS7 payload and destination IP address is provided by one of the local SIGTRAN processes 350 to a process on a particular interface, typically the process that invoked the local SGITRAN process. In step 480, the IP packet is assembled, with the source IP address and other IP header information. In step 490, the IP packet is forwarded according to the IP routing table and IP configuration data, applying whatever IP technologies are associated with the IP addresses by the IP configuration data. These IP technologies include any available at the time the system is implemented, including any or all of those listed above.

Thus, using the methods 400 and 401, an SS7 capable router may replace a coupled IP gateway-STP device pair in a signaling network and provide at less cost per device more routing options for signaling data than are available using the STP and gateway pair at a higher cost per device.

In other embodiments, other signaling data is forwarded in concert with IP routing technologies.

4.0 IMPLEMENTATION MECHANISMS

Hardware Overview

Figure 5:
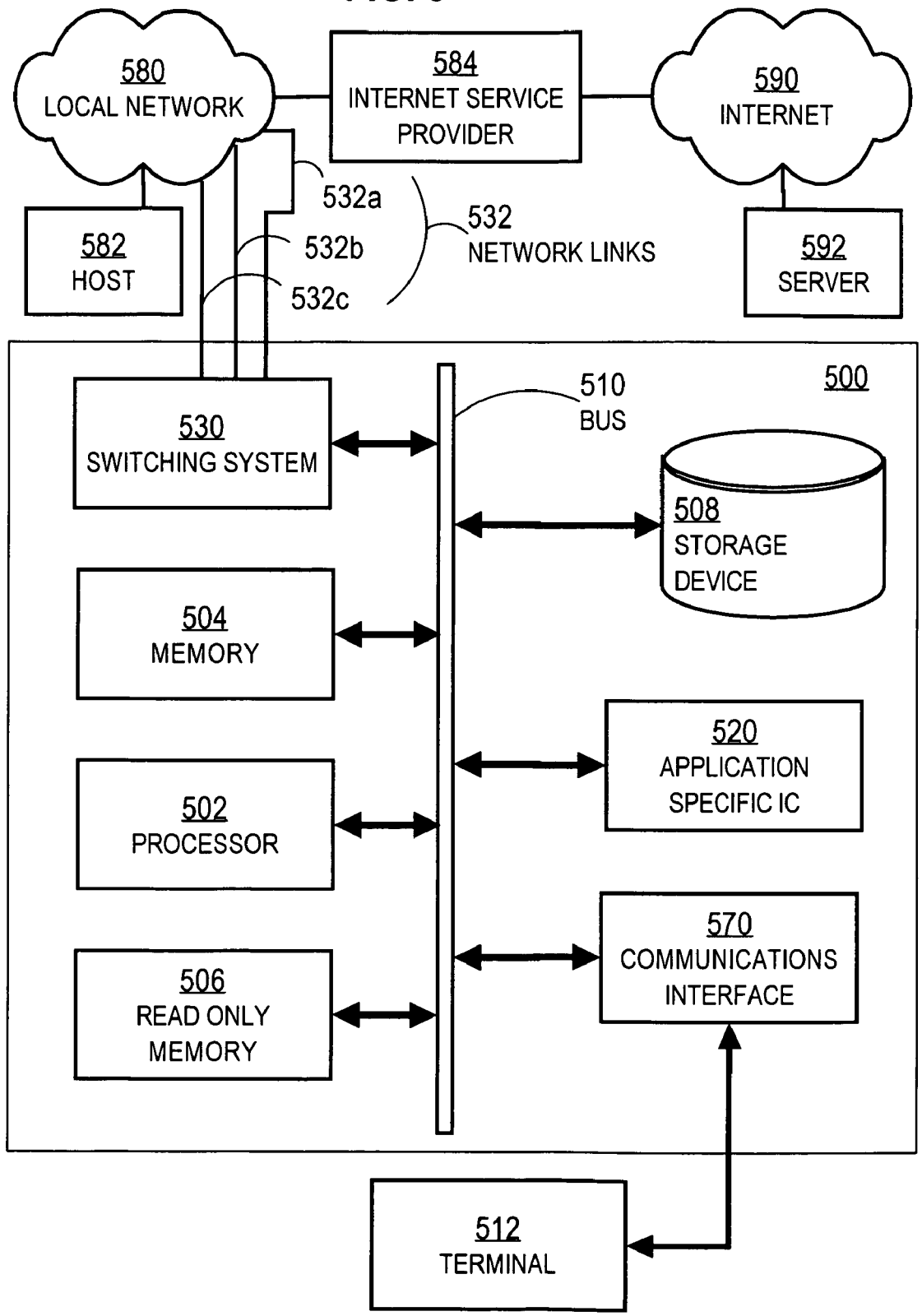
FIG. 5 is a block diagram that illustrates a computer system configured as a router, upon which an embodiment of the invention may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, which carry information to and from computer system 500, are exemplary forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532b through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532b. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing an Internet Protocol (IP) packet at a router that supports signaling between switches of a circuit switched network, comprising the steps of:

receiving Internet Protocol (IP) routing data that indicates an association between a network link and an IP address for a node in a signaling network including a plurality of signaling nodes;

receiving an ingress IP data packet;

determining whether conditions are satisfied for locally processing a signaling payload within the ingress IP data packet, wherein the signaling payload supports at least one of a physical circuit or a virtual circuit persistently established between a calling node and called node;

if the conditions are satisfied for locally processing the signaling payload, then performing the step of locally processing the signaling payload without sending the signaling payload over a network link to a different node in the signaling network; and if the conditions are not satisfied for locally processing the signaling payload, then routing the ingress IP data packet based on the IP routing data and ingress header data in an IP header portion of the ingress IP data packet.

2. A method as recited in claim 1, wherein the signaling payload is a Signaling System 7 (SS7) payload for a persistent physical circuit.

3. A method as recited in claim 1, said step of determining whether conditions are satisfied for locally processing the signaling payload further comprising the steps of:

determining whether an IP destination in an IP header portion of the ingress IP data packet matches an IP address of the router; and determining whether a next protocol field in the IP header indicates a Stream Control Transport Protocol (SCTP).

4. A method as recited in claim 3, said step of determining whether conditions are satisfied for locally processing the signaling payload further comprising the step of determining whether data in an SCTP port field in the SCTP header indicates an SCTP port that matches a port in a list of open local SCTP ports.

5. A method as recited in claim 4, said step of locally processing the signaling payload further comprising the steps of:

determining a particular interface identifier for a local network interface through which the ingress IP data packet was received;

determining an owner interface identifier for a local network interface associated with the SCTP port in the list of open SCTP ports;

determining whether the particular interface identifier matches the owner interface identifier; and if the particular interface identifier does not match the owner interface identifier, then sending the IP data packet for processing by a processor associated with the owner interface identifier.

6. A method as recited in claim 1, said step of locally processing the signaling payload further comprising the steps of:

determining a particular protocol to process the signaling payload portion of the ingress IP data packet; and providing the signaling payload portion of the ingress IP payload portion to a local process for the particular protocol.

7. A method as recited in claim 6, wherein:

the method further comprises receiving IP configuration data that indicates a configured IP function associated with a configured IP address; and said step of locally processing the signaling payload further comprising the steps of receiving an IP destination and an egress IP payload from the local process for the particular protocol after processing the signaling payload portion of the ingress IP data packet;

forming an egress IP header portion of an egress IP data packet based in part on the IP destination, and sending the egress IP data packet based on the egress IP header portion and the IP routing data and the IP configuration data.

8. A method as recited in claim 7, wherein the IP configuration data indicates at least one IP address associated with an interface physical layer conversion.

9. A method as recited in claim 7, wherein the IP configuration data indicates at least one IP address associated with a rate limitation.

10. A method as recited in claim 7, wherein the IP configuration data indicates at least one IP address associated with an access control list.

11. A method as recited in claim 7, wherein the IP configuration data indicates at least one IP address associated with a traffic filter.

12. A method as recited in claim 7, wherein the IP configuration data indicates at least one IP address associated with a tunneling lower layer protocol, such as multiple protocol label switching (MPLS).

13. A method as recited in claim 7, wherein the IP configuration data indicates at least one IP address associated with a virtual private network collection of tunnels.

14. A method as recited in claim 7, wherein the IP configuration data indicates at least one IP address associated with a quality of service.

15. A method as recited in claim 7, wherein the IP configuration data indicates at least one IP address associated with a policy limitation.

16. A method as recited in claim 7, wherein the IP configuration data indicates at least one IP address associated with packet encryption.

17. A method as recited in claim 7, wherein the IP configuration data indicates at least one IP address associated with version 7 Internet Protocol addresses.

18. A method as recited in claim 7, wherein the IP configuration data indicates at least one IP address associated with hot standby routing protocol.

19. A method as recited in claim 7, wherein the IP configuration data indicates at least one IP address associated with next hop resolution protocol.

20. A method as recited in claim 1, wherein:

the method further comprises the step of receiving IP configuration data that indicates a configured IP function associated with a configured IP address; and said step of receiving the ingress IP data packet further comprises applying the configured IP function to the ingress IP data packet based on an IP header portion of the ingress IP data packet and the IP routing data and the IP configuration data.

21. An apparatus that supports signaling between switches of a circuit switched network comprising:

means for receiving Internet Protocol (IP) routing data that indicates an association between a network link and an IP address for a node in a signaling network including a plurality of signaling nodes;

means for receiving an ingress IP data packet;

means for determining whether conditions are satisfied for locally processing a signaling payload within the ingress IP data packet, wherein the signaling payload supports at least one of a physical circuit or a virtual circuit persistently established between a calling node and called node;

means for performing the step of locally processing the signaling payload on the apparatus, if the conditions are satisfied for locally processing the signaling payload; and means for routing the ingress IP data packet based on the IP routing data and ingress header data in an IP header portion of the ingress IP data packet, if the conditions are not satisfied for locally processing the signaling payload.

22. An apparatus that supports signaling between switches of a circuit switched network comprising:
   a network interfaces that is coupled to a network that supports signaling between switches of a circuit switched network for communicating therewith a data packet;
   one or more processors;
   a computer-readable medium; and
   one or more sequences of instructions stored in the computer-readable medium, which, when executed by the one or more processors, causes the one or more processors to carry out the steps of:
      receiving Internet Protocol (IP) routing data that indicates an association between a plurality of network interfaces and a plurality of IP addresses for network nodes;
      receiving an ingress IP data packet on the network interface;
      determining whether conditions are satisfied for locally processing a signaling payload within the ingress IP data packet, wherein the signaling payload supports at least one of a physical circuit or a virtual circuit persistently established between a calling node and called node;
      if the conditions are satisfied for locally processing the signaling payload, then performing the step of locally processing the signaling payload on the apparatus; and
      if the conditions are not satisfied for locally processing the signaling payload, then routing the ingress IP data packet based on the IP routing data and ingress header data in an IP header portion of the ingress IP data packet.

23. An apparatus as recited in claim 22, wherein the signaling payload is a Signaling System 7 (SS7) payload for a persistent physical circuit.

24. An apparatus as recited in claim 22, said step of determining whether conditions are satisfied for locally processing the signaling payload further comprising the steps of:
   determining whether an IP destination in an IP header portion of the ingress IP data packet matches an IP address of the router; and
   determining whether a next header protocol field in the IP payload header portion of the ingress IP data packet indicates a Stream Control Transport Protocol (SCTP) header.

25. An apparatus as recited in claim 24, said step of determining whether conditions are satisfied for locally processing the signaling payload further comprising the step of determining whether data in an SCTP port field in the SCTP header indicates an SCTP port that matches a port in a list of open local SCTP ports.

26. An apparatus as recited in claim 22, said step of locally processing the signaling payload further comprising the steps of:
   determining a particular protocol to process the signaling payload portion of the ingress IP data packet; and
   providing the signaling payload portion of the ingress IP payload portion to a local process for the particular protocol.

27. An apparatus as recited in claim 26, wherein:
The one or more sequences of instructions causes the one or more processors to carry out the step of receiving IP configuration data that indicates a configured IP function associated with a configured IP address; and
said step of locally processing the signaling payload further comprising the steps of
   receiving an IP destination and an egress IP payload from the local process for the particular protocol after processing the signaling payload portion of the ingress IP data packet,
   forming an egress IP header portion of an egress IP data packet based in part on the IP destination, and
   sending the egress IP data packet based on the egress IP header portion and the IP routing data and the IP configuration data.

* * * * *

UNITED STATES PATENT AND TRADEMARK OFFICE
CERTIFICATE OF CORRECTION

| | | |
|---|---|---|
| PATENT NO. | : 7,616,643 B2 | Page 1 of 1 |
| APPLICATION NO. | : 11/407660 | |
| DATED | : November 10, 2009 | |
| INVENTOR(S) | : Delaney et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 576 days.

Signed and Sealed this

Nineteenth Day of October, 2010

David J. Kappos
*Director of the United States Patent and Trademark Office*